(12) United States Patent
Quintanilla Ayache et al.

(10) Patent No.: US 11,795,088 B2
(45) Date of Patent: Oct. 24, 2023

(54) AUTOMATED, MOBILE, LOW POWER CONSUMPTION WITH A HYBRID POWER CAPACITY WASTEWATER TREATMENT FACILITY

(71) Applicant: GALIPER INDUSTRIAL SA DE CV, Veracruz (MX)

(72) Inventors: Jaime Quintanilla Ayache, Veracruz (MX); Jesus Damian Garcia Delgado, Veracruz (MX); Josue Quintanilla Ayache, Veracruz (MX); Marcelo Javier Comarin, Veracruz (MX)

(73) Assignee: GALIPER INDUSTRIAL SA DE CV, Veracruz (MX)

( * ) Notice: Subject to any disclaimer, the term of this patent is extended or adjusted under 35 U.S.C. 154(b) by 121 days.

(21) Appl. No.: 17/392,593

(22) Filed: Aug. 3, 2021

(65) Prior Publication Data

US 2022/0388882 A1    Dec. 8, 2022

(30) Foreign Application Priority Data

Jun. 2, 2021    (MX) ................. MX/U/2021/000283

(51) Int. Cl.
*C02F 9/20*    (2023.01)
*C02F 1/28*    (2023.01)
(Continued)

(52) U.S. Cl.
CPC ................ *C02F 9/20* (2023.01); *C02F 1/004* (2013.01); *C02F 1/24* (2013.01); *C02F 1/283* (2013.01);
(Continued)

(58) Field of Classification Search
CPC .... C02F 9/20; C02F 1/004; C02F 1/24; C02F 1/283; C02F 1/52; C02F 1/76;
(Continued)

(56) References Cited

U.S. PATENT DOCUMENTS 10,501,357 B1 *  12/2019  McKinney ............. B01D 21/02

FOREIGN PATENT DOCUMENTS

| JP | 2000167580 A | * | 6/2000 | ............... C02F 3/12 |
| JP | 2004223448 |   | 1/2003 |                          |

OTHER PUBLICATIONS

Translation of JP_2000167580_A_M.pdf (Year: 2000).*

(Continued)

*Primary Examiner* — Ekandra S. Miller-Cruz
(74) *Attorney, Agent, or Firm* — Defillo & Associates, Inc.; Evelyn A. Defillo

(57) ABSTRACT

The present invention describes an automated, transportable and energy-efficient with a hybrid power capacity wastewater treatment facility that allows for the disinfection of contaminated sanitation wastewater in order to preserve the environment and provide a greater availability of this resource and its reuse. The facility described in the present invention allows to carry out a process for water treatment in five stages based in equalization, oxidation sedimentation, disinfection and filtration. Moreover, it has a photovoltaic feeding system and a night lighting system that allows the operation of the facility in a hybrid way during the day and the night, as well as a structure that allows its easy transportation. Finally, the facility has an automated system comprised by a control panel that allows to manage and monitor every operational condition of it, that integrates and sends all processed programmable information to a programmable logic controller.

13 Claims, 5 Drawing Sheets

(51) Int. Cl.
- *C02F 1/00* (2023.01)
- *C02F 3/12* (2023.01)
- *C02F 1/76* (2023.01)
- *C02F 1/24* (2023.01)
- *C02F 1/52* (2023.01)

(52) U.S. Cl.
CPC .................................. *C02F 1/52* (2013.01); *C02F 1/76* (2013.01); *C02F 3/1242* (2013.01); *C02F 2001/007* (2013.01); *C02F 2201/009* (2013.01); *C02F 2203/006* (2013.01); *C02F 2203/008* (2013.01); *C02F 2209/005* (2013.01); *C02F 2209/02* (2013.01); *C02F 2209/06* (2013.01); *C02F 2209/10* (2013.01); *C02F 2209/22* (2013.01); *C02F 2209/42* (2013.01); *C02F 2303/04* (2013.01); *C02F 2303/10* (2013.01); *C02F 2303/185* (2013.01); *C02F 2303/26* (2013.01)

(58) Field of Classification Search
CPC .............. C02F 3/1242; C02F 2001/007; C02F 2201/009; C02F 2203/006; C02F 2203/008; C02F 2209/005; C02F 2209/02; C02F 2209/06; C02F 2209/10; C02F 2209/22; C02F 2209/42; C02F 2303/04; C02F 2303/10; C02F 2303/185; C02F 2303/26; C02F 2209/29; Y02W 10/10
USPC .......................................................... 210/86
See application file for complete search history.

(56) References Cited

OTHER PUBLICATIONS

C. Neto, J. Campos. Tratamento de esgotos sanitários por processo anaeróbic e disposição controlada no solo. In: J. R. Campos (Coord.). Programa de Pesquisas em Saneamento Básico—PROSAB. Ed. ABES. Rio de Janeiro, 1999, pp. 1-28.
BOEEP—https://www.chinaboeep.com/Mobile-Portable-Wastewater-Treatment-Plant-for-Membrane-Sludge-Dehydration-pd6959228.html.

\* cited by examiner

AUTOMATED, MOBILE, LOW POWER CONSUMPTION WITH A HYBRID POWER CAPACITY WASTEWATER TREATMENT FACILITY

OBJECT OF THE INVENTION

The object of the present invention is to provide an automated, with a hybrid power capacity, for the treatment of wastewater, that allows for the disinfection of contaminated sanitation wastewater to preserve the environment and promote greater availability of this resource and its reuse. This invention belongs to the technical field of devices or other means related to the treatment of water or wastewater.

BACKGROUND

The basis of biological wastewaters treatment has as an objective the removal of pollutants from the water by using microorganisms. In most cases, the organic soluble and insoluble material, as per nitrogen, are efficiently removed by the biological action. Another predominant mineral is phosphorus which contributes in a greater degree to eutrophication of lakes and natural waters, its presence causes many problems in water quality and its removal is normally obtained by chemical precipitation, which turns out to be expensive and causes an increase in the volume of mud up to 40%. One alternative is the biological phosphorus removal (BPR), nonetheless, such process still presents limitations for its implementation in treatment facilities that use biological treatments. The removal of organic material, the clotting of non-sedimentable colloidal solids and the stabilization of organic matter are carried out by a wide variety of microorganisms, mainly bacteria. Thus, to effectively design any biological water treatment process, it is necessary to take into account the nutritional requirements of the needed microorganisms for cellular growth and the obtention of energy, the microorganism's metabolism, the relation between microbial growth and substrate utilization and, of course, the environmental factors that affect microbial growth. Among the most important environmental factors to be considered are the temperature, pH, and oxygen present in the biological reactor.

The most used and known biological treatment for water is the active sludge or activated sludge process, this process is based in the existence of a suspended biomass (in the water) and uses microorganisms that grow and group together forming floccules that in turn form an active microbial mass called "active or activated sludge". The term "active" refers to the sludge's (microorganisms) capacity to metabolize the soluble and colloidal organic matter into carbon dioxide and water. The mixture of active sludge and wastewater is called "mixed liquor". The process of active sludge consists primarily of:

A ventilation tank (reactor) in which microorganisms are kept ventilated and in suspension,
A solids separation system (usually a sedimentation tank) and,
A recirculation system to return the sedimented biomass (microorganisms and solid waste) to the reactor.

Since its invention in the early twentieth century, the active sludge process continues to be the most used biological treatment in wastewater treatments. Nonetheless, numerous improvements and variants have been introduced to this process, mainly focused on nutrient elimination in addition to the removal of organic material.

Water treatment processes are widely used in water treatment plants that are permanently installed and currently satisfy most of the market's necessities, however, sanitary waste treatment in remote communities or difficult access worksites that are derived from all operating industries, is a current need since they use provisional operation bases such as campers or trailers for personnel during their stay, and thus optimize logistics, give comfort to their operators, provide a space for cooking, bathing and overnight stay. All these campers have domestic water discharge units for wastewater, that come from bathrooms and washing areas and that in most cases contains suspended solids, organic compounds, (40-60% of protein, 25-20% of carbohydrates, 10% of oils and fat), nutrients (nitrogen and phosphorous), metals, non-organic dissolved solids, lifeless solids, thick solids, non-biodegradable compounds, pathogenic organisms (C. Neto, J. Campos. Tratamento de esgotos sanitários por processo anaeróbio e disposição controlada no solo. In: J. R. Campos (Coord.). Programa de Pesquisas em Saneamento Básica—PROSAB. Ed. ABES. Rio de Janeiro. 1999. pp. 1-28)[1], soapy water, among other things, this wastes are normally directed to a septic tank or a sewage tank with a capacity of 1.5 to 3 $m^3$, depending of the number of people who inhabit the camper, where the effluents are received and represent a problem since: septic tanks require a complementary service of suction of the sewage that is produced by each of the camper trailers that are at the temporary operations base which represents logistical expenses, or contracting services, in the case that there is no sewage removal from the tanks daily, either due to an access blockage of the location or due to failure of the service provider, these tanks will overflow and will throw the wastewater on the floor, causing bad smell, infection sources and poor quality of the basic health conditions that working personnel require in this type of operations, promoting risk conditions for endemic diseases such as cholera and dengue fever, and operationally, the use of septic tanks force to make larger provisional operating bases, since they must consider the space of the septic tank, the space of the camper trailer, the space of the staircase to access the camper and the space for access of the truck for sewage suction, which increase the total cost of the operations since they have to consider a greater $AFE^2$ for the construction site.

[1] Bibliographical citation has not been translated since it is in Portuguese.
[2] AFE is the abbreviation for Authorization for Expenditure There are currently some solutions in the market that seek to provide wastewater treatment facilities in a remote way, but they do not incorporate all the control and automation elements as in this invention, for example, the company BOEEP provides a mobile water treatment facility with sludge dehydration membranes that has the pump pipes for sludge shredding and an automated system for sludge sedimentation, but lack of a remote and controlled operation, and they are not able to carry out disinfection or treatment processes after the activation of sludge, this facility is not practical in terms of its transportation. (Available online: https://www.chinaboeep.com/Mobile-Portable-Wastewater-Treatment-Plant-for-Membrane-Sludge-Dehydration-pd6959228.html).

Moreover, the technology presented in JP2004223448A, describes an automated water treatment facility to control the injection range of sterilizing substances or disinfectants that includes an aeration and nutrient supply tank, as well as a controlled disinfection system, but it does not provide a sedimentation and separation of activated sludge tank, and the most important thing is that it is not mobile, nor does it allow for transportation to a temporary operation base.

Once the state of the art is presented and observing the different technologies that are currently in operation, we proceed to describe the characteristics of the present invention, which differentiate it from the previously mentioned inventions and therefore represent a technical advantage and comply with novelty.

DETAILED DESCRIPTION OF THE INVENTION

Figure 1:
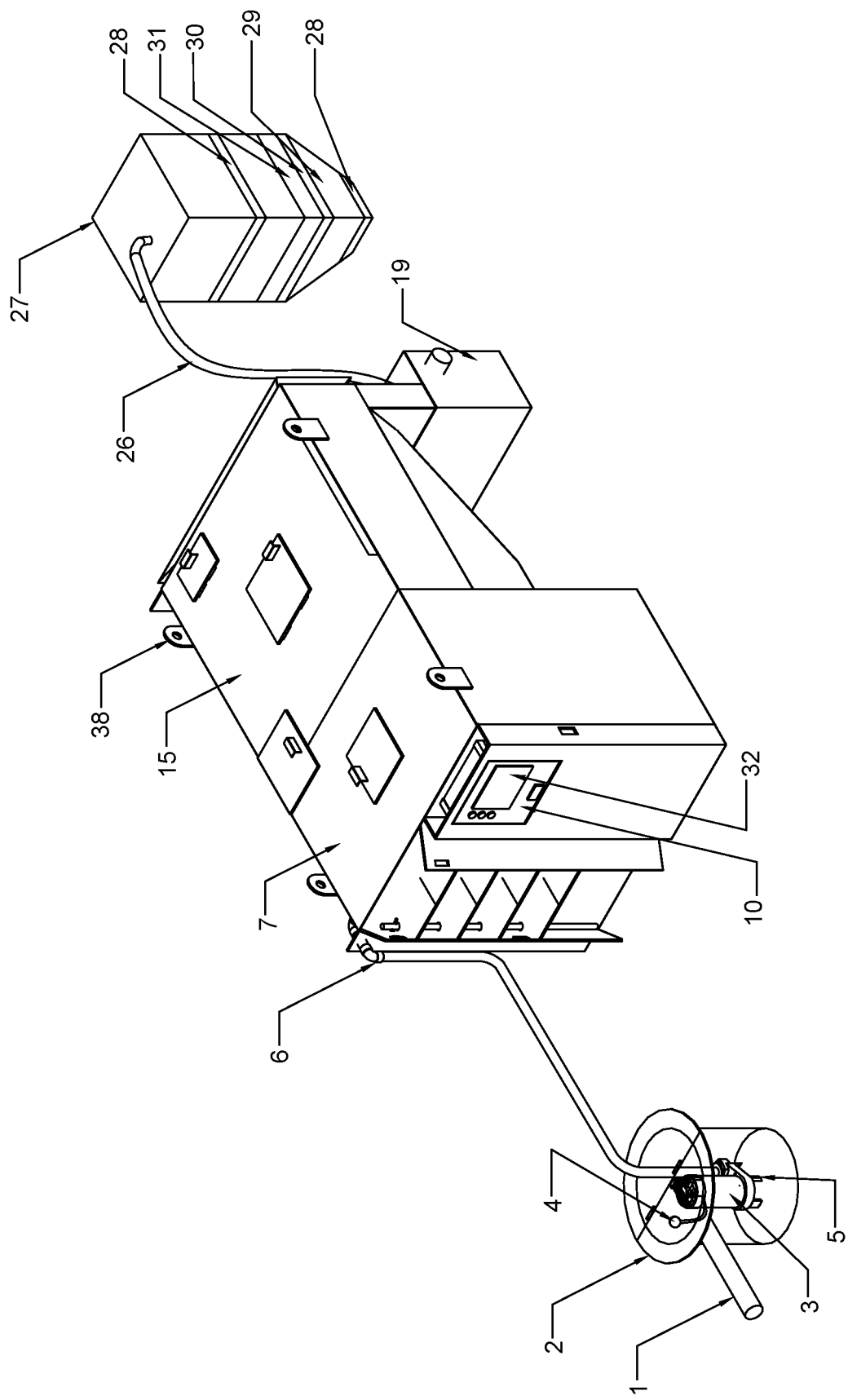
FIG. 1. Exploded perspective of the components that take part in the automated, transportable, mobile, low power consumption with a hybrid power capacity wastewater treatment process facility.

The present invention describes an automated, with a hybrid power capacity (connected to an electrical current or a photovoltaic power) facility for wastewater treatment by oxidative and biological degradation of the liquids originated from a sewage installation, utilizing aerobic digestion which is comprised of one or more raw wastewater feeding pipelines (1) that carry raw wastewater directly from a source of wastewater to one or more rough solid crushing pump pits (2) comprised by an electrical submersible pump (3), actioned by a float type level sensor (4), where the activation of the electrical submersible pump (3) with a stainless steel solid shredder pusher (5) allows it to generate a homogenous substance which is then pumped through a flexible hose with quick coupling (6) to a biological reactor (7), which has the purpose of removing suspended or dissolved organic material in the homogenous mixture, through an aerobic system (with air presence) consisting of an electrical submersible pump (8) that through an eductor/aerator (9), oxygenates the water contained in the biological reactor (7) up to 6.0 mg/L of the dissolved oxygen, which is triggered by a programmable logic controller (10), that is located in a control panel (32), and in order to automate the operation of the facility detects readings of the process conditions through a series of sensors, a dissolved oxygen sensor (11), for monitoring and controlling the oxygen in the aeration process, and a suspended solids sensor (12), for the biological sludge and microorganisms generation which are used for the organic matter degradation, the mixture resulting from the biological reactor (7), which passes overflowing, through a communication pipeline (13), which has a screen (14) to guarantee the passage of only water to a sedimentation and mud separation tank (15), in which the separation of the liquid phase and the solid phase occurs, through a process of sedimentation, filtration, flotation and precipitation, in which the liquid phase is the water with, dejected and clarified organic material, while the solid phase is the sludge, the sedimentation and sludge separation tank (15) has an electrical submersible pump (16) at its bottom that allows the recirculation of the biological sludge to the biological reactor (7), managed by the programmable logic controller (10), the result of the liquid phase of the sedimentation and sludge separation tank (15) enters overflowing through a communication channel (17), which has a screen (18) to guarantee the passage of only water through a disinfection tank (19) that has an automated supply system of sodium hypochlorite (20) for the elimination of pathogen and bacteria present in water, the disinfection tank (19) has sensors in order to automate the operation of this and guarantee the quality of the resulting water, a pH sensor (23), a suspended solids sensor (12), a chlorine sensor (24), and a temperature sensor (25), likewise the disinfection tank (19) considers a screen system (21) that is utilized to prevent the passage of solids to the final filtration process alongside with an electro-valve (37) that eliminates solid materials that may have passed to this tank, the disinfected water in the disinfection tank (19) is pumped by an electrical submersible pump (22) and a connection hose (26) that is connected to a filtration tank (27) which contains gravel (28) with different granulometries, activated carbon (29), garnet (30) and silica sand (31), with which the water treatment is obtained, furthermore the facility has a photovoltaic feeding system made up of a package of solar panels (33) for energy generation through solar energy, with a storage battery bank (34) of the energy obtained during the day and for its continuous use during the night, where the energy generation is managed by a local charge controller that is located in the control panel (32) being part of the programmable logic controller (10) that operates the energy displacement to the storage battery bank (34) for storage and to providing it during the night while there is no energy generation so that the system maintains its continuous operation, the charge controller allows the connection of an alternate source of energy and at the same time, the local charge controller sends information related to voltage, current and consumption to the programmable logic controller (10) for its dynamic graphs display in the control panel (32) and sends it to remote access sites, the facility has a night lighting system (35), composed by at least two lamp towers that illuminate the totality of the area used by the facility and its nearby surroundings, this lamps are fed by the package of solar panels (33) and the storage battery bank (34), the lamps have high-resolution digital cameras (36), that allow to have photographs frame by frame from certain periods of time and/or real-time video, of everything that is happening around the facility and with this a visual monitoring of it, finally the facility has a series of anchors (38) that allow it to be transported from one place to another easily and it is mounted in a platform (39) that is integrated with the photovoltaic feeding system and the night lighting system (35).

Preferred Implementation of the Invention

The automated facility of this invention is formed in a modality by elements that allow to carry out a 5-stage process (FIG. 1):

STAGE 1: Equalization: It is comprised by one or more raw wastewater feeding pipelines (1) that conduct raw wastewater originating directly from the wastewater zone to one or more rough solid crushing pumping pit (2), which is preferably a fiberglass receptacle with an approximate capacity for 225 L (liters), the rough solid crushing pumping pit (2), is comprised by an electrical submersible pump (3), of variable capacity and power, actioned by a float-type level sensor (4), where the electrical submersible pump (3) allows a stainless steel solid crushing impeller (5) to generate a homogenous substance which is then pumped through a flexible hose with quick coupling (6), preferably of 2 inches in diameter, to a biological reactor (7), STAGE 2: Oxidation: Comprised by a biological reactor (7), that has a module made up of a carbon steel plate 3/16 inches thick, with a 2250 L of capacity, where the biological reactor (7), has the purpose of removing suspended or dissolved organic material in the homogenous mixture, through an aerobic system (with air presence) composed by an electrical submersible pump (8) of 2 HP (HP, Horse Power) through an eductor/aerator (9) of 2 inches, oxygenates the water contained in the biological reactor (7) up to 6.0 mg/L of the dissolved oxygen, which is triggered by a programmable logic controller (10), that is located in a control panel (32), making it work for a period of 20 minutes, for every hour. For the process of organic material removal it is necessary the use of nutrients, (vitamins and minerals elaborated mixture), which serves as food for the bacteria in the wastewater, these bacteria, "fortified", consume the organic material present in the process. This module has a series of sensors, that automate the functionality of this:

A dissolved oxygen sensor (11), for monitoring and controlling the oxygen in the aeration process, A suspended solids sensor (12), for controlling the generation of biological sludge and microorganisms which are used for the organic matter degradation, STAGE 3: Sedimentation: The mixture that results from STAGE 2 which passes overflowing, through a communication pipeline (13), which has a screen (14) to guarantee the passage of only water, to a sedimentation and sludge separation tank (15), this tank is built with a carbon steel plate 3/16 inches thick, with a 1000 L of capacity, and is where the separation of the liquid and solid phases occurs, through the process of sedimentation, filtration, flotation and precipitation. The liquid phase is the water with dejected and clarified organic material, while in the solid phase is the sludge, the sedimentation and sludge separation tank (15) have an electrical submersible pump (16) of 1½ HP at the bottom that allows the recirculation of the biological sludge to the biological reactor (7), managed by the programmable logic controller (10), located in the control panel (32), which is triggered in periods of 15 seconds, every 20 minutes to obtain greater decomposition, STAGE 4: Disinfection: The resulting mixture from STAGE 3 which passes overflowing, through a communication pipeline (17) which has a screen (18) to guarantee the passage of only water to a disinfection tank (19) which is built with carbon steel plates of 3/16 inches thick, with a capacity of 400 L and has an automated supply system of sodium hypochlorite (20), for the elimination of pathogens and bacteria in the water. Its design comprises a screens system (21) that are used to prevent the passage of solids to the final filtration process, alongside an electro-valve (37) of 2" for the removal of solid materials that may have passed to this stage.

Figure 3:
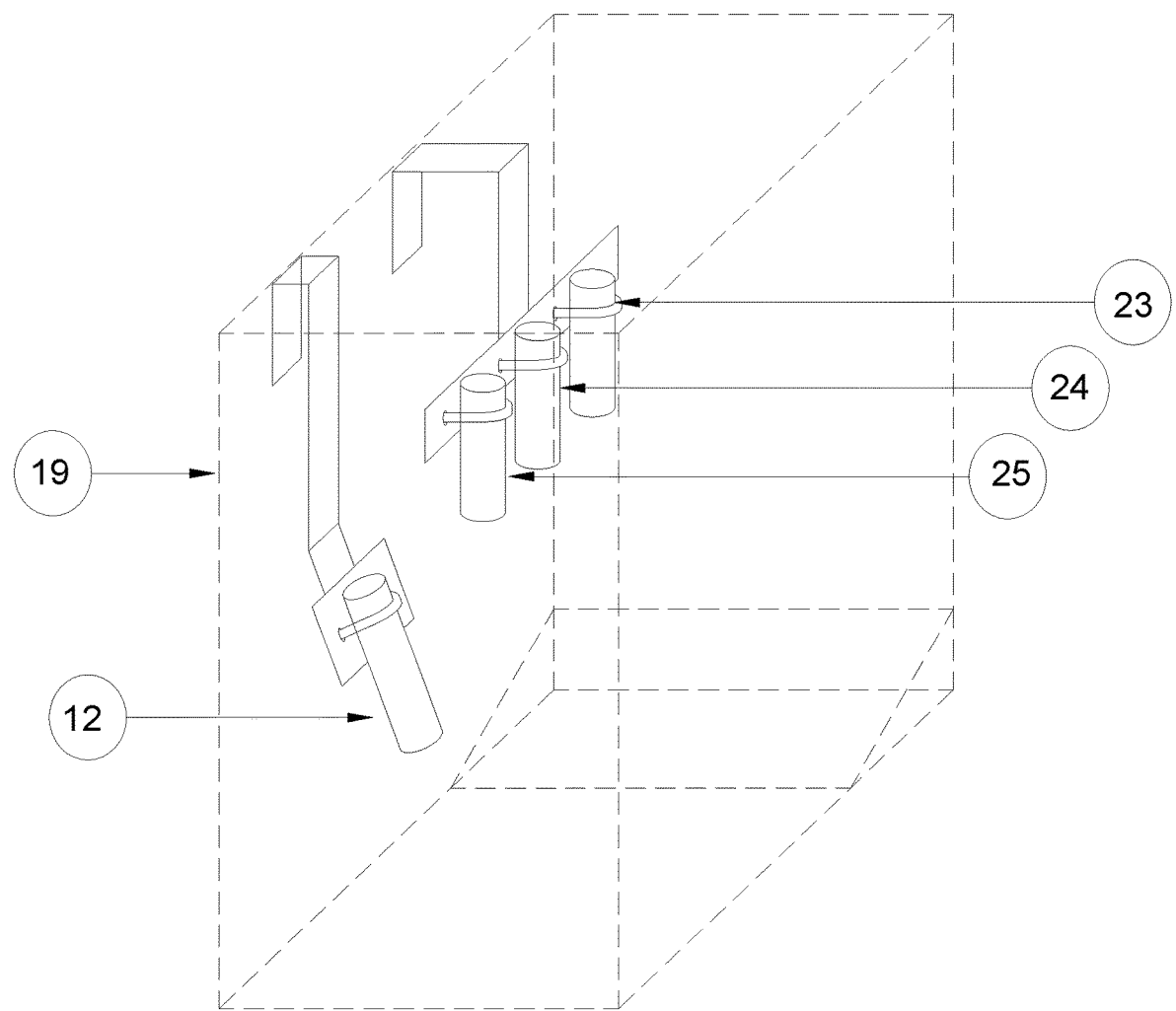
FIG. 3. Detailed view of the disinfection tank (19) sensors.

The disinfection tank (19) also has an electrical submersible pump (22) of ¾ HP, which is used for pumping water to the filtration process in a filtration tank (27). The sensors present in this disinfection tank (19) (FIG. 3) that provide the means to automate the functioning of this and that guarantee the quality in the water that result from it, are:

A pH sensor (23),
A suspended solids sensor (12),
A chlorine sensor (24),
A temperature sensor (25).

Figure 2:
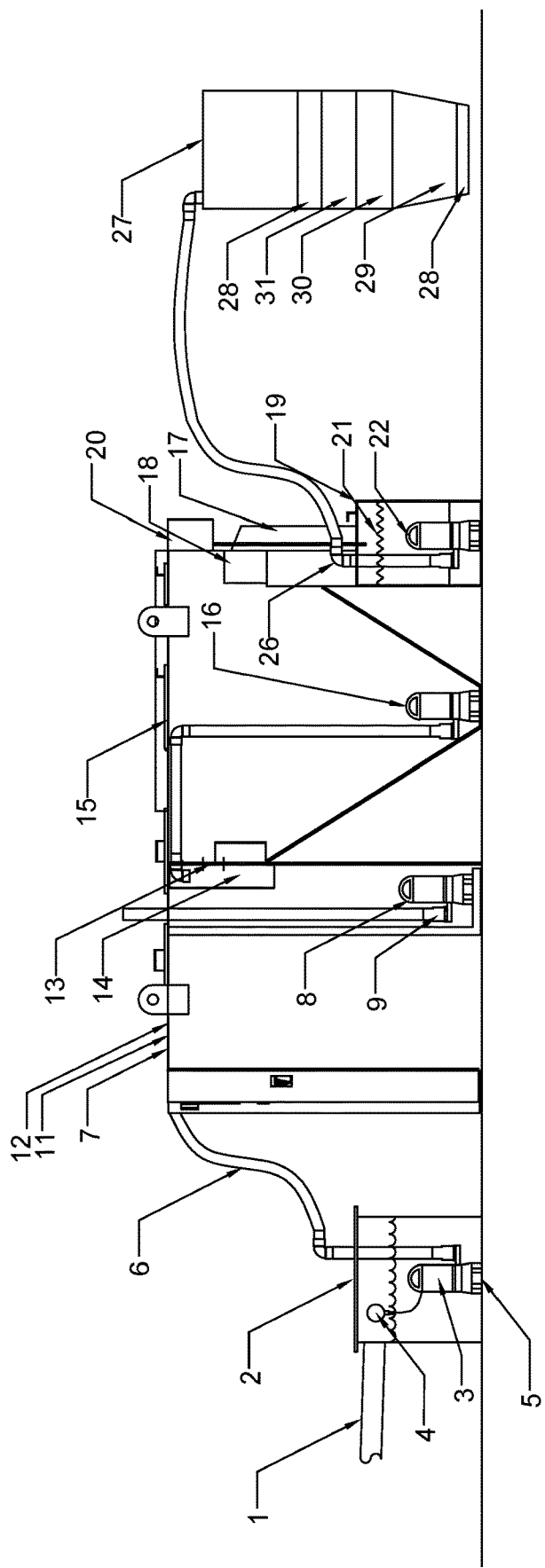
FIG. 2. Exploded side view of the components that take part in the automated, transportable, mobile, low power consumption with a hybrid power capacity wastewater treatment process facility.

STAGE 5: Filtration: The resulting water from STAGE 4 enters by pumping through a connection hose (26) to the filtration tank (27) which is built with a carbon steel sheet plate of caliber 14 of thickness, with a filtration capacity of 200 L per hour. The filtration tank (27) contains in its interior gravel (28) of different granulometries, activated carbon (29), garnet (30) and silica sand (31), with which the water treatment is achieved and that surpasses the requirements of the NOM-001-SEMARNAT-1996, (Maximum permissible limits of contaminants in wastewater discharges for national waters and assets), and leaves us within the range of NOM-124-SSA1-1994, (Permissible limits for the quality an treatment to which water must be subject to for purification). The components that undertake this process are shown in FIG. 2.

Furthermore, the facility has, a photovoltaic feeding system. The facility has a package of solar panels (33) for energy generation through solar energy, with a storage battery bank (34), from the energy obtained during the day and for its continuous use during the night, which permits full operation of the plant in an autonomous way, with a 3 day back up for operations without solar energy. This energy generation is managed by a local charge controller that is located in the control panel (32) being part of the programmable logic controller (10), that performs the function of energy displacement to the storage battery bank (34) for storage and providing it during the night while there is no energy generation so that the system keeps its continuous operation, the charge controller also allows the connection of an alternate source of energy (energy provided by an institution or an electric generator) which gives the system a hybrid energy classification. At the same time the local charge controller sends information related to voltage, current and consumption to the programmable logic controller (10) for its dynamic graphs display in the control panel (32) and sends it to remote access sites.

The facility has a night lighting system (35), composed by at least two lamp towers that illuminate the totality of the area used by the facility and its nearby surroundings, this lamps are powered by the package of solar panels (33) and the storage battery bank (34), the lamps have high-resolution digital cameras (36), that allow to have photographs frame by frame from certain time periods and/or live video, of everything that is happening around the facility and with this, a visual monitoring of it. The photographs and/or videos taken, are sent for viewing to remote access sites.

Figure 4:
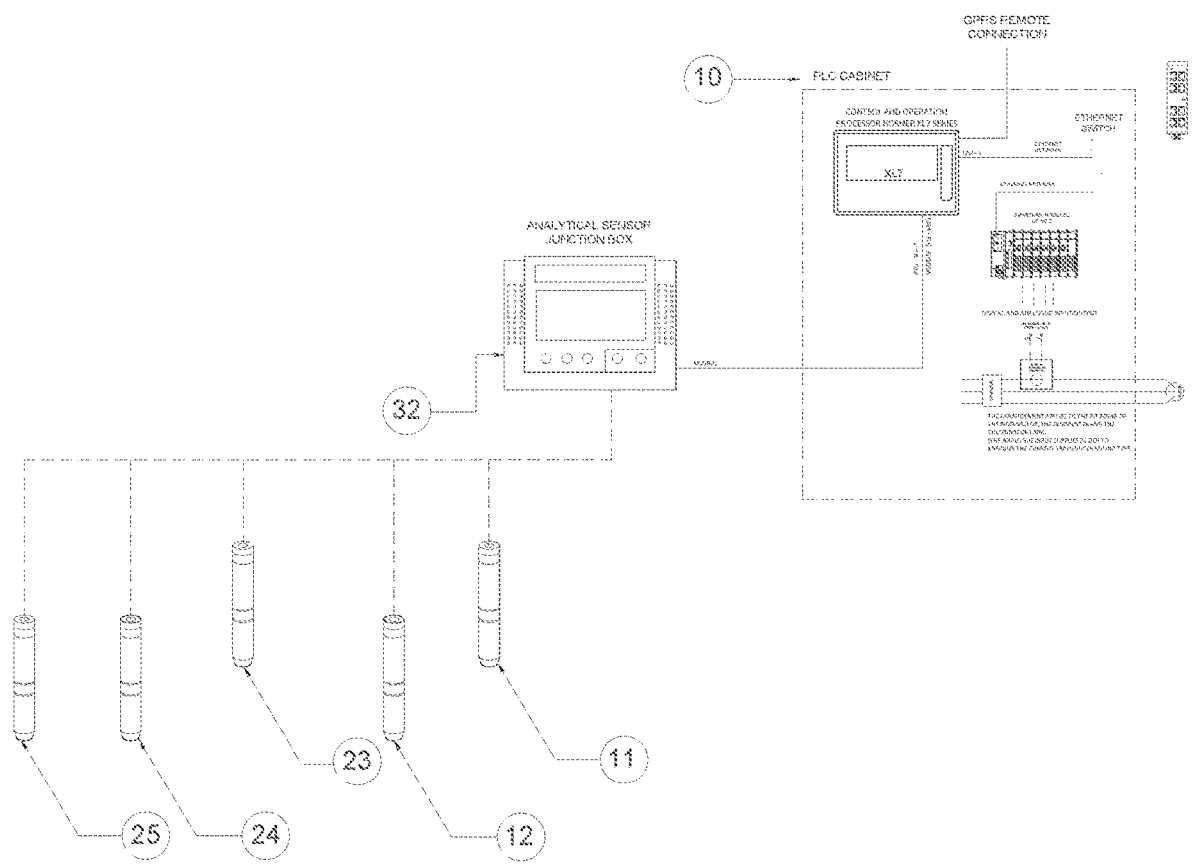
FIG. 4. Detailed view of the sensors, control panel (32) and programmable logic controller (10) present in the automated, transportable, mobile, low power consumption with a hybrid power capacity wastewater treatment facility.

Automated system (FIG. 4). Moreover, the device has an automation system that is comprised of a control panel (32) that allows to manage and monitor every operational condition of it, integrating and sending all programmable information processed by a programmable logic controller (10) as the main element for controlling and monitoring the facility. This programmable logic controller (10) has the following functions, without limitation to:

Control of the operation of the electrical submersible pump (8) of 2 HP that oxygenates the water contained in the biological reactor (7) through an eductor/aerator (9) of 2 inches.

Monitoring of the dissolved oxygen parameter in the biological reactor (7).

Monitoring of the suspended solids parameter in the biological reactor (7) through the suspended solids sensor (12) that is utilized to control the supply of vitamins and minerals for the fortification and reproduction of the bacteria present in the wastewater, which consume the organic material of the process.

Control of the operation of the electrical submersible pump (16) of 1½ HP, with which the sludge buildup recirculates to the biological reactor (7) to obtain an even greater breakdown.

Control of the operation of the electrical submersible pump (22) of ¾ HP, which is used to pump water into the filtration tank (27).

Control of the operation of an electric-valve (37) of 2", (STAGE 4), for the elimination of solid materials from the disinfection tank (19) that may have passed through this stage.

Monitoring of the PH parameter for water quality, through a submerged pH sensor (23) that analyzes water and provides this data.

Monitoring the temperature parameter through, a temperature sensor (25).

Monitoring and controlling the Chloride parameter (STAGE 4), through a submerged chlorine sensor (24) that analyzes and provides this data, which is used to control the amount of chlorine that is applied to the disinfection tank (19) for the removal of pathogen and bacteria present in the water.

Monitoring of the suspended solids parameter (STAGE 4), through a submerged suspended solids sensor (12) that analyzes and provides this data, to verify the cleanliness of the water from solid impurities.

Monitoring of the outgoing currents from the submerged electric pumps of the different stages to prevent a failure in their operation.

Monitoring of the voltage, current and energy consumption measuring parameters produced by the package of solar panels (33), that feeds and allows the autonomous operation of the facility (Through a protocol link between the controller and the photovoltaic system).

The control panel (32) has an LCD screen, for the real time dynamic graphs display, that allows field personnel to perform local monitoring, for user control, ease of review and monitoring of all parameters mentioned before or any other that may be deemed necessary for the correct operational performance.

Communication with the integrated web device, that allows remote access via GPRS protocol, to provide remote access to both the geo-referenced location of the facility, as well as the measurement parameters and operation controls of such, said remote link may be done via website, via programmed reports that are to be sent via email to defined users.

Figure 5:
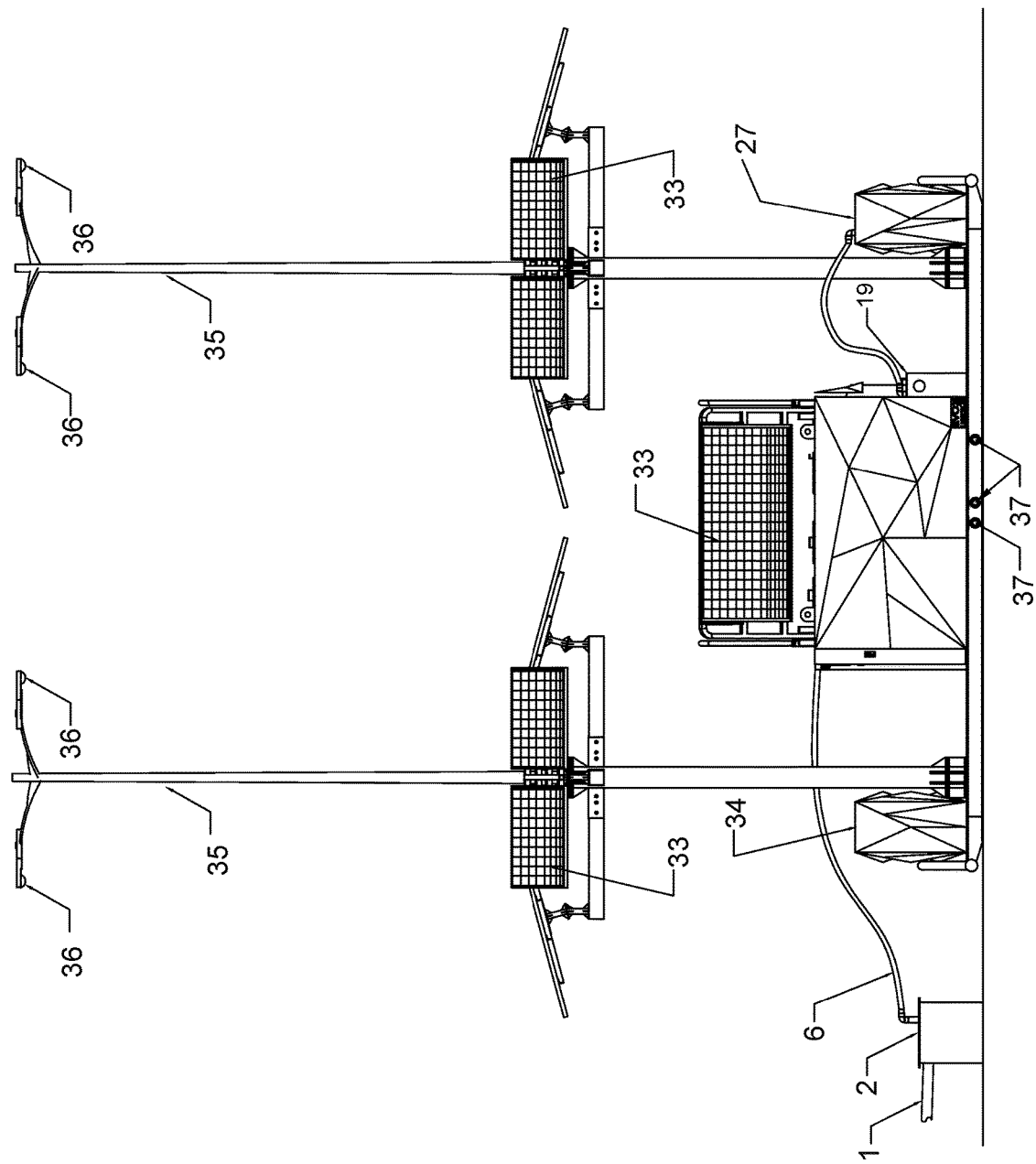
FIG. 5. Side view of the components of the automated, transportable, mobile, low power consumption with a hybrid power capacity wastewater treatment facility.

Structure and transport. The facility has a series of anchors (38) that allow it to be easily transferred from one place to another, additionally the facility is mounted in a platform (39) integrated with the photovoltaic feeding system and the night lighting system (35), and is optionally covered with panels that protect the facility components, likewise in the top part of the facility a series of structures are mounted for the supervision of the operation of the facility. The integration of all the parts of the facility is shown in FIG. 5.

Installation of a Sanitary Network and Attachments

For the correct installation of a wastewater treatment facility, it is necessary to make a projection determining the best position for the facility always planning the slope of the sanitary pipeline route of 4" of diameter towards the septic tank for wastewater collection.

The pipeline network or sanitary network is comprised of PVC piping and its joints are sealed by a PVC sealant, or lithium grease, which will be applied where appropriate with a brush, for the sealing to be officiated and avoid loss. Before completing the pipeline network, verification or the recommendations checklist must be carried out, which is in the facility installation manual.

While the sanitary network is done, the attachments of the facility such as lighting towers, solar panels, platforms, and rails or structures must be assembled. The correct functioning of the communication network and the image quality of the video cameras should be guaranteed as well.

Implementation

For the correct implementation, the installation operator must confirm that the facility is leveled, if it is not, techniques such as soil compaction or placement of sleepers or poles can be used to correct leveling.

In the first place, the previously elaborated sanitary network must be connected as it was done in the projection, this is connected by a 2" hose with quick coupling connections, these connections must be made from the septic tank to the biological reactor (7) of the facility.

It must be verified that the end switches and the differential switches of the control panel (32) are out (de-energized) for the connection of all attachments of the facility, thus safeguarding the integrity of all personnel and the facility from any errors in the connection.

Verification of the status of the photovoltaic system such as the battery charge, the voltage and the charge generated from the solar panels should be made.

Next, the differential switch is activated, then a 2A single-phase thermo-magnetic switch that feeds the programmable logic controller (10) until the program start is verified auditorily and visually.

It is observed that the commanded contactors begin to be activated by the programmable logic controller (10). Then, the following thermal-magnetic keys should be lifted this way, energizing the electric-mechanical equipment, allowing to appreciate the correct operation and sequence for low consumption of the equipment.

At last, the facility is filled with water until completion for aeration level, this process should be done in case of starting a new service. The return of liquids to the biological reactor (7) from the sedimentation and sludge separation tank (15) through the recirculation electrical submersible pump (16) and the operation of the eductor/aerator (9) must be visualized.

By entering water through the pipeline to the raw wastewater feeding pipelines (1), the verification of the process starts up and shutting off of the float-type level sensor (4), that will activate the electrical submersible pump (3), of the rough solid crushing pumping pit (2).

Monitoring

Due to the capacity of the equipment installed in the facility, the values registered form the facility to the control panel (32) must be verified, next, wireless data transfers and the correct operation of the facility done by the programmable logic controller (10) and its communication protocols should be verified.

Having sufficiently described my invention, I consider as a novelty and therefore claim as my exclusive property, what is contained in the following clauses:

1. An automated, mobile, low power consumption with a hybrid power capacity wastewater treatment facility comprising: one or more raw wastewater feeding pipelines (1) that carry raw wastewater directly from a wastewater generation source to one or more rough solid crushing pumping pit (2) comprising a first electrical submersible pump (3), actioned by a level sensor (4), wherein the first electrical submersible pump (3) with a stainless steel solid crushing impeller (5) allows to generate a homogenous substance which is then pumped through a flexible hose with quick coupling (6) to a biological reactor (7) for removing suspended or dissolved organic material in the homogenous mixture, through an aerobic system comprising a second electrical submersible pump (8) that oxygenates the wastewater and the wastewater treatment contained in the biological reactor (7) up to 6.0 mg/L of the dissolved oxygen, by means of an eductor or aerator (9), which is triggered by a programmable logic controller (10), that is located in a control panel (32), and in order to automate the function of the facility, detects readings of the process conditions through a dissolved oxygen sensor (11) and a suspended solids sensor (12), to control the generation of biological sludge and microorganisms which are used for the organic matter degradation, a mixture resulting from the biological reactor (7), which passes overflowing, through a communication pipeline (13), including a screen (14) to allow the passage of water, to a sedimentation and sludge separation tank (15), in which the separation of a liquid phase and a solid phase occurs by sedimentation, filtration, flotation, and precipitation, in which the liquid phase is water, while in the solid phase is sludge, the sedimentation and sludge separation tank (15) has a third electrical submersible pump (16) that allows a recirculation of the biological sludge to the biological reactor (7), managed by the programmable logic controller (10), the liquid phase resulting from the sedimentation and sludge separation tank (15) enters overflowing, through a communication channel (17), including a screen (18) to allow the passage of water through a disinfection tank (19) that has an automated supply system of sodium chloride (20) for the elimination of pathogen and bacteria present in water, the disinfection tank (19) comprises a pH sensor (23), the suspended solids sensor (12), a chlorine sensor (24), and a temperature sensor (25), the disinfection tank (19) further comprises a screen system (21) to prevent the passage of solids to a filtration tank (27) and an electric valve (37) to eliminate solid materials passed to the disinfection tank, disinfected water from the disinfection tank (19) is pumped by a fourth electrical submersible pump (22) to a connection hose (26) that is connected with the filtration tank, which contains gravel (28) of different granulometries, activated carbon (29), garnet (30) and silica sand (31), with which the water treatment is achieved, furthermore the facility has a photovoltaic feeding system made up of a package of solar panels (33) for energy generation through solar energy, with a storage battery bank (34), of the energy obtained during the day and for continuous use during the night, in which the energy generation is managed by a local charge controller that is located in the control panel (32) being part of the programmable logic controller (10), that performs the energy displacement to the storage battery bank (34) for storage and to provide during the night while there is no energy generation so that the system maintains continuous operation, the local charge controller also allows the connection of an alternate source of energy and at the same time, the local charge controller sends information related to voltage, current, and consumption to the programmable logic controller (10) for displaying dynamic graphs in the control panel (32) and sends the information to remote access sites, the facility has a night lighting system (35) comprising at least two lamp towers that illuminate the totality of the area used by the facility and nearby surroundings, the lamp towers are fed by the package of solar panels (33) and the storage battery bank (34), the lamp towers have high-resolution digital cameras (36), that allow to have photographs frame by frame from certain time periods or live video, of everything that is happening around the facility and with a visual monitoring, finally the facility has a series of anchors (38) to transport and mount in a platform (39) that is integrated with the photovoltaic feeding system and the night lighting system (35).

2. The facility according to claim 1, wherein the rough solid crushing pumping pit (2) is a fiberglass receptacle with an approximate capacity for 225 liters.

3. The facility according to claim 1, wherein the flexible hose with the quick coupling (6), the flexible hose has 2 inches of diameter.

4. The facility according to claim 1, wherein the biological reactor (7) is a module built of a carbon steel plate $3/16$ inches thick, with a 2250 liters capacity.

5. The facility according to claim 1, wherein the second electrical submersible pump (8) of the biological reactor (7) is of 2 horse power and the eductor or aerator (9) is of 2 inches.

6. The facility according to claim 1, wherein the sedimentation and sludge separation tank (15), is constructed with a carbon steel plate $3/16$ inches thick, with a 1000 liters capacity.

7. The facility according to claim 1, wherein the third electrical submersible pump (16) from the sedimentation and sludge separation tank (15) is of 1½ horse power.

8. The facility according to claim 1, wherein the third electrical submersible pump (16) from the sedimentation and sludge separation tank (15) is of 1½ horse power and is triggered in periods of 15 seconds, every 20 minutes.

9. The facility according to claim 1, wherein the disinfection tank (19) is constructed with carbon steel plates of $3/16$ inches thick, with a capacity of 400 liters.

10. The facility according to claim 1, wherein the fourth electrical submersible pump (22) from the disinfection tank (19) is of ¾ horse power, and the electric-valve (37) is of 2".

11. The facility according to claim 1, wherein the filtration tank (27) is constructed with 14-gauge thick carbon steel sheet plates, with a filtration capacity of 200 liters per hour.

12. The facility according to claim 1, further comprising covering panels.

13. The facility according to claim 1, further comprising a series of rails mounted in a top end of the facility.

* * * * *